Oct. 27, 1953  J. K. DOUGLAS ET AL  2,656,854
PILOT OPERATED FREE RETURN RESISTANCE VALVE
Filed Dec. 30, 1949  5 Sheets-Sheet 3

INVENTORS
JAMES K. DOUGLAS
WILLIAM G. DOUGLAS
BY
ATTORNEY

Patented Oct. 27, 1953

2,656,854

UNITED STATES PATENT OFFICE 2,656,854

PILOT OPERATED FREE RETURN RESISTANCE VALVE

James K. Douglas and William G. Douglas, Shorewood, Wis., assignors to The Oilgear Company, Milwaukee, Wis., a corporation of Wisconsin Application December 30, 1949, Serial No. 135,962

20 Claims. (Cl. 137—620)

This invention relates to valves of the type which normally are closed and prevent flow of liquid therethrough but which will open to permit liquid to flow therethrough in response to the pressure of the liquid exceeding a predetermined maximum. Valves of this type ordinarily are employed as relief valves to limit the pressures created by pumps but valves embodying the present invention may also be employed for other purposes as will appear hereinafter.

Relief valves of the current types operate reasonably well as long as they are not subject to violent fluctuations in pressure but, if made in sizes large enough to pass large volumes of liquid at high pressures, they would be entirely unsatisfactory.

The present invention has as an object to provide a resistance valve which will operate satisfactorily under high pressures when made in sizes large enough to pass very large volumes of liquid.

Another object is to provide a resistance valve which will operate quietly.

Another object is to provide a resistance valve which will not chatter when made in large sizes.

Another object is to provide a resistance valve which may be used for different purposes.

Another object is to provide a resistance valve which will open and close without causing shocks in the hydraulic circuit in which the valve is connected.

Another object is to provide a resistance valve which will open at a high pressure and also will open momentarily at an intermediate pressure and permit passage therethrough of a small volume of liquid in response to a sudden increase in the pressure of the liquid to prevent the sudden increase in pressure from causing a shock in the system in which the valve is connected.

Other objects and advantages will appear from the following description of a resistance valve embodying the invention and illustrated in the accompanying drawings in which the views are as follows.

Figs. 1–8

Figures 1, 3:
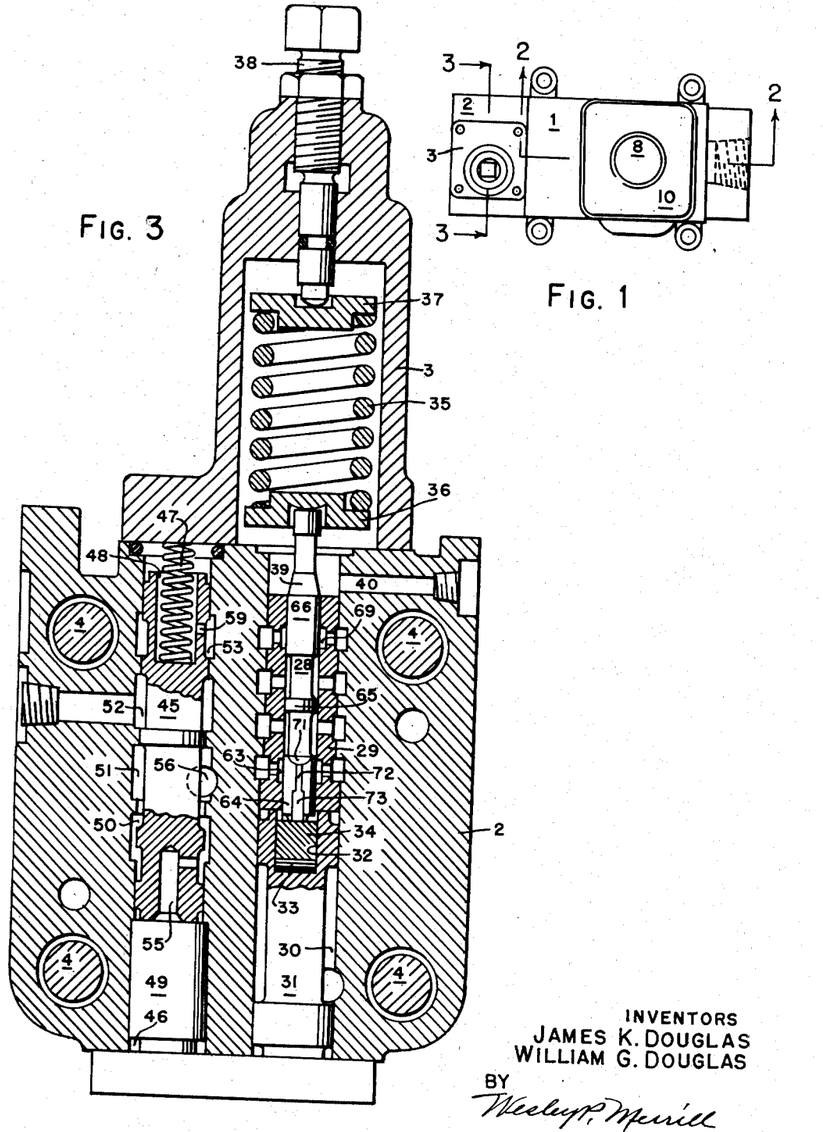
Fig. 1 is an outside view of the complete valve, the view being a horizontal plan in respect to Figs. 2 and 3.
Fig. 3 is a section through a pilot head which contains pilot valves for controlling operation of the main valve shown in Fig. 2, the plane of the view being indicated by the line 3—3 of Fig. 1.
Figure 2:
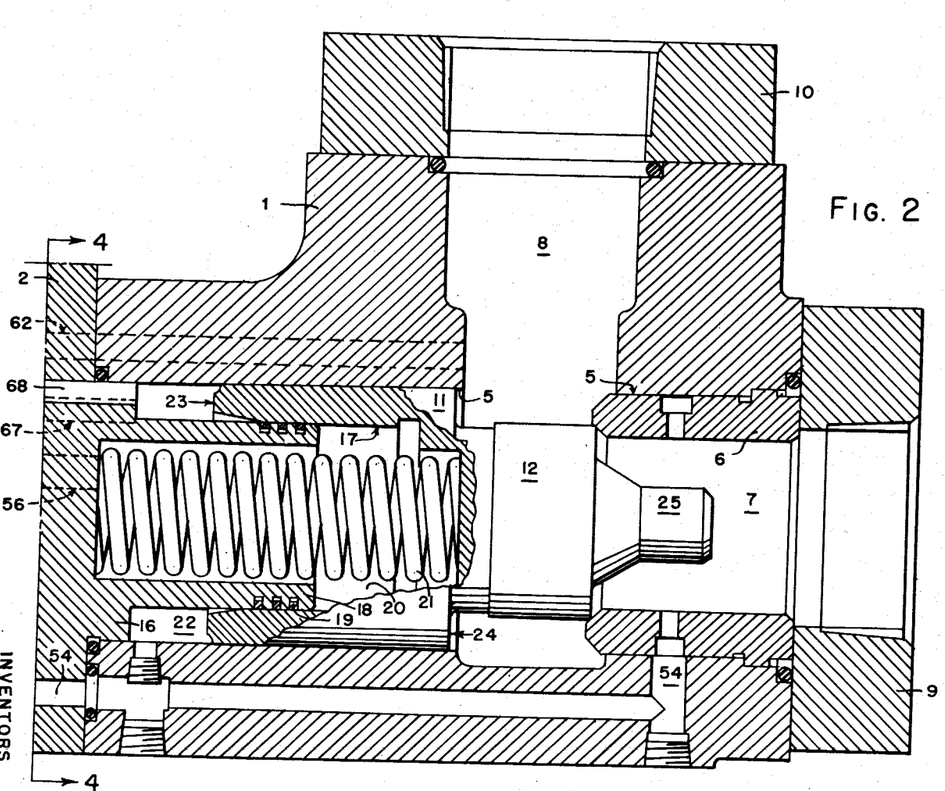
Fig. 2 is a central longitudinal section through the valve body which contains the main valve, the plane of the view being indicated by the line 2—2 of Fig. 1.
Figure 4:
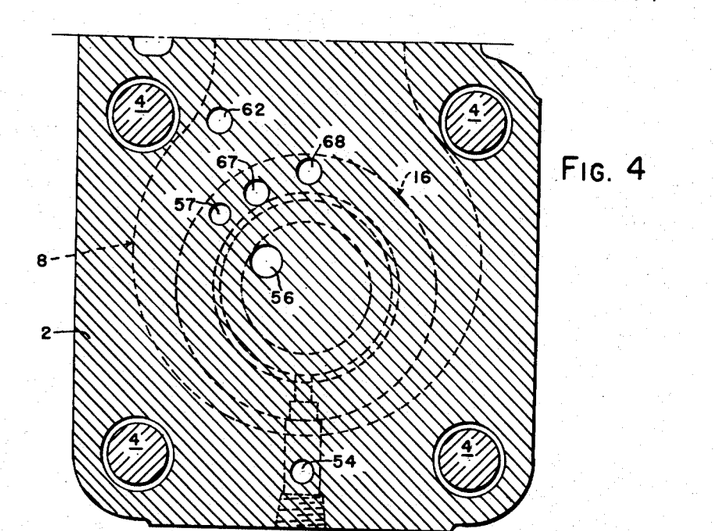
Fig. 4 is a section taken on a line 4—4 of Fig. 2.

The resistance valve chosen for illustration has its mechanism arranged within a suitable casing which has been shown as including a valve body 1, a pilot head 2 arranged at the left end of body 1 in respect to Fig. 2, and a spring housing 3 which is fastened to head 2 upon the upper end thereof in respect to Fig. 3. Body 1 and head 2 are fastened to each other by four bolts 4 which are equally spaced so that body 1 may be mounted in any one of four different positions in respect to head 2.

Body 1 has a bore 5 extending therethrough and a hardened annular valve seat 6 fixed in the right end of bore 5. The opening through valve seat 6 constitutes the outlet port 7 of the resistance valve. Bore 5 is intersected at the inner end of seat 6 by a passage which constitutes the inlet port 8 of the resistance valve. In order that the resistance valve may be connected into a hydraulic circuit, two pipe flanges 9 and 10 are bolted to body 1 with the openings therethrough in alignment with ports 7 and 8 respectively.

The left hand portion of bore 5 in respect to Fig. 2 constitutes a cylinder for a hollow piston 11 which is closely fitted therein and is provided upon its outer end with a hardened valve 12 which normally extends across inlet port 8 and engages the beveled inner end of valve seat 6. The end of valve 12 is made flat to thereby form a sharp square corner so that valve 12 makes only a line contact with seat 6 and thus when closing is enabled to make a metal-to-metal contact with seat 6 regardless of the viscosity of the liquid or of any foreign matter therein. Valve 12 may be provided with a sharp corner for the reason that it never impinges violently against seat 6.

The left end of bore 5 in respect to Fig. 2 has closely fitted therein an annular shoulder 16 which is formed integral with pilot head 2. The arrangement is such that, by removing bolts 4, valve body 1 may be rotated upon shoulder 16 to any one of four different positions for the reason that bolts 4 are equally spaced around a circle struck from the axis of shoulder 16.

Piston 11 has formed therein a cylinder 17 for a hollow stationary piston 18 which is concentric with shoulder 16 and is formed integral therewith. Cylinder 17 is made substantially fluid tight by closely fitting piston 18 therein or by providing piston 18 with suitable piston rings 19. The interiors of pistons 11 and 18 constitute a spring chamber 20 to receive a compression spring 21 which bears upon opposite ends thereof and urges valve 12 against seat 6.

Piston 11 and the annular face on shoulder 16 around piston 18 form between the wall of bore 5 and the outer periphery of piston 18 a pressure chamber 22 into which the pressure prevailing in inlet port 8 normally extends as will presently be explained. The annular area 23 of piston 11 around piston 18 constitutes a hold-on area upon which the pressure in chamber 22 acts and causes piston 11 to urge valve 12 against seat 6.

Valve 12 is made smaller in diameter than piston 11 to thereby provide on the end of piston 11 an annular lifting area 24 which is exposed to the pressure in inlet 8. The liquid in inlet 8 acts upon area 24 and tends to lift valve 12 away from seat 6 but hold-on area 23 is made slightly (such as 7%) larger than lifting area 24 so that, so long as the pressure in chamber 22 is equal to the pressure in inlet 8, valve 12 is held against seat 6 by spring 21 and by the difference between the forces exerted upon areas 23 and 24 by the liquid. Spring 21 is strong enough to positively move valve 12 against seat 6 when there is no pressure in valve body 1 but it will yield and permit a low pressure, such as 25 p. s. i. in outlet 7 to lift valve 12 away from seat 6 when chambers 20 and 22 are connected to exhaust.

When there is a high pressure in inlet port 8 and liquid is permitted to escape from chambers 20 and 22, the force exerted by the high pressure liquid upon lifting area 24 will raise valve 12 and thereby provide between valve 12 and valve seat 6 a narrow annular opening through which liquid will flow at high velocity from inlet port 8 into outlet port 7. The liquid will flow radially from all directions through the annular opening and, due to its high velocity, it will tend to enter outlet port 7 nearly at right angles to the axis thereof. If the liquid entering outlet port 7 should come together upon the axis of outlet port 7 while moving radially at a high velocity, a loud and disagreeable noise would result. In order to avoid creation of such a noise, valve 12 is provided upon the end thereof with an abutment 25 which prevents the liquid entering outlet port 7 from coming together until after it is decelerated and it is moving longitudinally through outlet port 7.

Valve 12 is controlled by a plurality of valves arranged in pilot head 2. Operation of valve 12 in response to variations in the pressure in inlet port 8 is under the control of a pilot valve 28 (Figs. 3, 5 and 6) which is closely fitted to slide within a sleeve 29 fixed in a bore 30 which extends through head 2 and has a filler block 31 closely fitted in the lower part thereof. Block 31 has a recess 32 formed in the upper part thereof to receive a plurality of shims 33 and a stop block 34 which rests upon shims 33 and limits the downward movement of valve 28. The initial position of valve 28 may be adjusted by varying the number of shims beneath block 34.

Valve 28 is urged downward by a helical compression spring 35 which is arranged within housing 3 and transmits force to valve 28 through a spring retainer 36. A second spring retainer 37 is arranged between the upper end of spring 35 and an adjusting screw 38 which is threaded through the upper end of housing 3 and may be turned to vary the tension of spring 35.

Figures 5, 6, 7, 8:
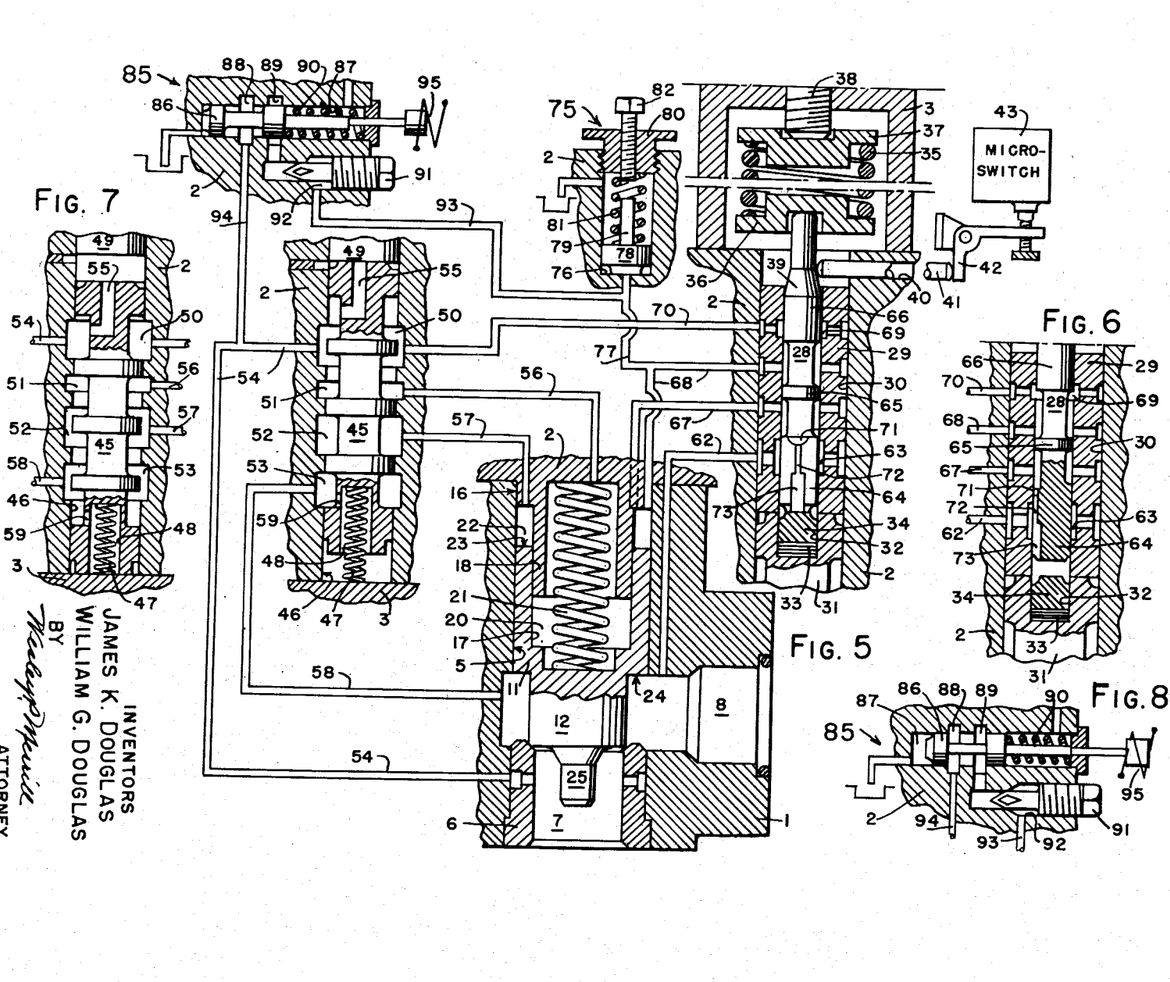
Fig. 5 is a diagram of the hydraulic circuit which controls operation of the main valve shown in Fig. 2.
Fig. 6 is a view showing a pilot valve in a position different from that shown in Fig. 5.
Fig. 7 is a view showing a reverse flow valve in a position different from that shown in Fig. 5.
Fig. 8 is a view showing a solenoid operated valve in a position different from that shown in Fig. 5.

Pilot valve 28 may be provided above the upper end of sleeve 29 with a tapered portion 39 and head 2 may be provided with a small bore 40 which communicates with bore 30 and in alignment with tapered port 39 so that, as shown in Fig. 5, a push rod 41 may be inserted in bore 40 and with its ends in contact with valve 28 and with an actuator 42 for a micro-switch 43 which may be employed to initiate a particular function of the machine or the hydraulic circuit with which the resistance valve is associated. The arrangement is such that, when valve 28 moves upward in response to the pressure in inlet port 8 exceeding a predetermined maximum as will presently be explained, push rod 41 will be moved outward by tapered portion 39 and cause actuator 42 to operate switch 43.

Operation of valve 12 in response to the pressure in outlet port 7 exceeding the pressure in inlet port 8 is under the control of a reverse flow valve 45 which is closely fitted for sliding movement in a bore 46 extending through head 2. Valve 45 is urged downward in respect to Fig. 3 by a spring 47 which is arranged in a spring chamber 48 formed in valve 45. Downward movement of valve 45 in respect to Fig. 3 is limited by a filler block 49 which is closely fitted in the lower end portion of bore 46.

Whenever the pressure in inlet port 8 exceeds the pressure in outlet port 7, the inlet pressure positively holds valve 45 in the position shown in Figs. 3 and 5 as will presently be explained. Therefore, in order that valve 45 may be shifted to the position shown in Fig. 7 in response to the pressure in outlet port 7 exceeding the pressure in inlet port 8 by only a small amount, spring 47 is made only strong enough to positively shift valve 45 to the position shown in Fig. 5 when there is no pressure either in outlet port 7 or in inlet port 8.

Fig. 3 shows valves 28 and 45 in their normal relative positions but, in order to simplify the diagram of the hydraulic circuit, valve 45 has been shown in Figs. 5 and 7 as being inverted in respect to valve 28 and in Fig. 5 valves 28 and 45 have been shown as being rotated 90° in respect to valve body 1.

As shown in Figs. 5 and 7, valve 45 controls communication between four annular grooves or ports 50, 51, 52 and 53 which are formed in the wall of bore 46. Port 50 communicates with outlet port 7 through a channel 54 and it communicates with a passage 55 which is formed in valve 45 and extends through the end thereof so that that end of valve 45 is at all times subjected to any pressure prevailing in outlet port 7. Port 51 communicates through a channel 56 with spring chamber 20. Port 52 communicates through a channel 57 with pressure chamber 22. Port 53 communicates through a channel 58 with inlet port 8 and it also communicates with spring chamber 48 through a passage 59 formed in valve 45 so that the spring end of valve 45 is at all times subjected to any pressure prevailing in inlet port 8.

In order to simplify the diagram of the hydraulic circuit, channel 59 has been shown in Fig. 5 as being connected directly to inlet port 8 but actually it is connected to a channel 62 which, as shown in Fig. 5, connects inlet port 8 to an annular groove or port 63 formed in pilot valve sleeve 29.

Pilot valve 28 has three spaced apart heads or pistons 64, 65 and 66 formed thereon and closely fitted in sleeve 29. Piston 64 limits the flow of liquid from channel 62 into a channel 67 which connects the interior of sleeve 29 to pressure chamber 22. Piston 65 blocks communication between channel 67 and a channel 68 which connects the interior of sleeve 29 to pressure chamber 22 at a point which is spaced from channel 67 so that liquid entering chamber 22 through channel 67 may flow therefrom through channel 68 and carry with it any air or gas which is trapped in chamber 22 as will presently be explained. Piston 66 controls communication between channel 68 and an annular groove or port 69 which is formed in sleeve 29 and communicates at all times with outlet port 7 as by being connected by a channel 70 to port 50 of reverse flow valve 45.

Pilot valve 28 is so constructed that the pressure in inlet port 8 can extend into pressure chamber 22 and hold valve 12 closed until liquid is permitted to escape from chamber 22. In the preferred construction, the upper edge of piston 64 extends to or just above the upper edge of port 63 when valve 28 is in its normal position as shown in Fig. 5, and a segmental recess 71 is sunk into the upper edge of piston 64 to provide limited communication between port 63 and channel 67 so that the pressure at inlet port 8 can extend into pressure chamber 22 but liquid can flow from port 8 into chamber 22 only at a very limited rate.

The pressure in chamber 22 acts upon hold-on area 23 and, when it is the same as the pressure in port 8, it positively holds valve 12 closed because area 23 is slightly larger than lifting area 24 as previously explained. If a back pressure should develop in port 7, it would act upon valve 12 and tend to open it but, as long as the back pressure is no higher than the pressure in inlet 8, it cannot open valve 12 for the reason that the back pressure would extend through channel 54, valve bore 46 and channel 56 into spring chamber 20 and act upon the inner end wall of cylinder 17 in opposition to the back pressure acting upon the end of valve 12.

Piston 64 of pilot valve 28 is also provided in its periphery with a shallow V-groove 72 which communicates at its upper end with recess 71 and has its lower end in alignment with the lower edge of port 63 when valve 28 is in its normal position as shown in Fig. 5. The lower end of groove 72 communicates with a deeper V-groove 73 which extends therefrom to the lower end of valve 28 so that the lower end of valve 28 is subjected to the pressure in port 63.

When the pressure in inlet port 8 reaches the pressure at which valve 12 is adjusted to open as determined by the adjustment of screw 38, liquid will flow from inlet port 8 through channel 62, port 63 and grooves 72 and 73 into recess 32 and raise valve 28. Small groove 72 will at first limit the rate at which liquid can enter recess 32 but, as soon as valve 28 starts upward, large groove 73 starts to register with port 63 and then liquid can flow rapidly into recess 32 and raise valve 28 at high speed.

Pilot valve 28 will move upward until piston 66 has uncovered port 69 and recess 71 has moved out of registry with port 63 as shown in Fig. 6. Then liquid can continue to flow from inlet port 8 to pressure chamber 22 at the very limited rate determined by small groove 72 but liquid can escape at a much faster rate from pressure chamber 22 through channel 68, pilot valve bushing 29, channel 70, port 50 of valve 45 and channel 54 into outlet port 7, thereby reducing the pressure in chamber 22 and permitting the pressure acting upon lifting area 24 to move valve 12 away from seat 6 so that liquid can flow from port 8 to port 7. Movement of valve 12 away from seat 6 causes piston 11 to eject liquid from pressure chamber 22 through the above described channels and to eject liquid from spring chamber 20 through channel 56, bore 46 and channel 54 into outlet port 7.

Valve 12 will move away from seat 6 until liquid can flow from port 8 to port 7 fast enough to prevent the pressure in port 8 from exceeding the predetermined maximum and then spring 35 will move pilot valve 28 downward and piston 66 thereon will throttle the flow of liquid from chamber 22 to thereby enable the liquid flowing from port 8 into chamber 22 to create therein just enough pressure to maintain valve 12 in the position in which it permits liquid to escape from port 8 just fast enough to prevent the pressure therein from exceeding the predetermined maximum.

Valves 12 and 28 will then remain stabilized and liquid will continue to flow from port 8 to port 7 until the pressure in port 8 drops sufficiently to permit spring 35 to return pilot valve 28 to the position shown in Fig. 5, thereby cutting off further escape of liquid from chamber 22 and increasing the rate at which liquid flows from inlet port 8 into chamber 22. The liquid entering chamber 22 will increase the pressure therein until it is substantially the same as the pressure in inlet port 8 and then it and spring 21 will cause piston 11 to move valve 12 into contact with its seat 6 at a rate proportional to the rate at which the liquid flows through recess 71 in pilot valve 28. Since valve 12 is thus closed gradually, closing it will not cause any appreciable shock in the system to which the resistance valve is connected. The rate at which valve 12 closes may be regulated by varying the number of shims under stop block 34 to thereby vary the area of recess 71 which is in registry with port 63 when pilot valve 28 is in its lower position.

If air or gas become entrapped in chamber 22 or entrained in the liquid therein, valve 12 might be inclined to chatter if the pressure in inlet 8 fluctuated when at or near the pressure at which the valve will open. However, during the time that valve 12 is open, the liquid flowing into chamber 22 through channel 67 and out of chamber 22 through channel 68 will carry away any air or gas that may accumulate in chamber 22 providing that the end of channel 68 is at or near the highest point of chamber 22. That is, with the inner end of channel 68 located as shown, the resistance valve should be so mounted that spring housing 3 is above pilot head 2 as shown in Fig. 3 and in the upper right hand portion of Fig. 9 or so that pilot head 2 is above body 1 as shown in the lower left hand portion of Fig. 9. By thus removing air or gas from chamber 22 and by causing valve 12 to close gradually as explained above, chattering of valve 12 is avoided.

When the pressure in inlet port 8 exceeds the pressure in outlet port 7, pressure will extend through channel 58, port 53, passage 59 and spring chamber 48 into bore 46 and positively hold valve 45 in the position shown in Figs. 3 and 5 so that no liquid can escape from chamber 22 through channel 57. When the pressure in outlet port 7 exceeds the pressure in inlet port 8 by a small amount such as 10 p. s. i. liquid will flow from outlet port 7 through channel 54, port 50 and passage 55 into bore 46 and cause valve 45 to shift into the position shown in Fig. 7 and to eject liquid from bore 46 through spring chamber 48, passage 59 and channel 58 into inlet port 8. Then, a low pressure in outlet port 7 sufficient to overcome the resistance of spring 21, such as 25 p. s. i., can move valve 12 away from its seat 6 for the reason that piston 11 in moving with valve 12 can eject liquid from chambers 20 and 22 through channels 56 and 57, valve bore 46 and channel 58 into inlet port 8. Then liquid will flow from outlet port 7 to inlet port 8 and valve 12 will be raised high enough to maintain in outlet port 7 only the low pressure required to resist the force exerted by a spring 21. Since the resistance valve is capable of remaining closed until the pressure in inlet port 8 reaches a high pressure, such as 5000 p. s. i., the pressure necessary to hold valve 12 open is relatively so low that the resistance valve may be considered as having a substantially free return flow.

When a channel, from which liquid cannot escape except by performing work which requires a high pressure, has motive liquid suddenly introduced into it such as by suddenly opening a valve, a shock and a noise will occur. If the liquid is introduced into the channel for the purpose of starting a loaded motor to which the channel is connected, the motor cannot start its load instantly but the liquid will continue to enter the channel and ordinarily the time required for the motor to start and to bring its load up to speed is greater than the time required for the incoming liquid to raise the pressure in the channel to maximum. If an ordinary relief valve were connected to the channel, it would open in response to the pressure reaching maximum and thereby cause a shock in the channel and a resultant noise.

In order to avoid shocks and noises under such conditions, the present invention provides means for permitting the resistance valve to open momentarily at pressures less than the maximum pressure. As shown in Fig. 5, the resistance valve may be provided with an expansion device 75 which has been indicated as being arranged within pilot head 2 but which may be made as a separate unit and fastened to head 2.

Expansion device 75 includes a cylinder 76, which communicates at one end thereof with pressure chamber 22 as by being connected to channel 68 by a channel 77, a piston 78 which is closely fitted in cylinder 76 and has a stem 79 extending therefrom, an adjusting nut 80 threaded into the outer end of cylinder 76, a spring 81 arranged between piston 78 and nut 80 to urge piston 78 against the end of cylinder 76 to which channel 77 is connected, and a stop screw 82 which is threaded through nut 80 to limit the distance that piston 78 can move away from the end of cylinder 76.

The arrangement is such that, when the pressure in chamber 22 becomes high enough to overcome the resistance of spring 81, piston 78 will move upward in respect to Fig. 5 until stem 79 engages stop screw 82. The pressure required to raise piston 78 may be varied by turning nut 80 to thereby vary the tension of spring 81 and the volume of liquid which can enter cylinder 76 may be varied by turning stop screw 82 to thereby vary the distance that piston 76 can move.

Assuming that the resistance valve has been adjusted by turning adjusting screw 38 to open at a maximum pressure of 3000 p. s. i., that inlet port 8 is connected to a channel in which the pressure is zero and that device 75 has been adjusted by turning nut 80 to respond to an increase of 200 p. s. i. in pressure, the resistance valve will function as follows:

When high pressure liquid is suddenly introduced into the channel to which port 8 is connected, liquid will start to flow from port 8 into pressure chamber 22 at the slow rate determined by the size of the small opening between recess 71 and port 63 of pilot valve 28 but the pressure in port 8 will rise substantially instantaneously to 200 p. s. i. and the force exerted by the liquid upon lifting area 24 will cause piston 11 to lift valve 12 away from seat 6 and to eject liquid from pressure chamber 22 into device 75, thereby permitting liquid to flow momentarily from port 8 to port 7 at 200 p. s. i. and preventing the sudden rush of pressure from causing a shock and a resultant noise.

Liquid will continue to flow at the limited rate into chamber 22 and gradually increase the pressure therein. When the pressure in chamber 22 is nearly equal to the pressure in port 8, the force exerted upon holdon area 23 by the liquid in chamber 22 will overcome the force exerted upon lifting area 24 by the liquid in port 8. Then the liquid entering chamber 22 will cause piston 11 to gradually close valve 12 at a rate proportional to the rate at which liquid enters chamber 22. Consequently, valve 12 is closed without causing a shock and a resultant noise.

The time that valve 12 remains open may be varied by varying the number of shims 33 under stop block 34 to vary the size of the opening between recess 71 and port 63 and thereby vary the rate at which liquid can flow from port 8 into chamber 22. The time that valve 12 remains open can also be varied by adjusting stop screw 82 to vary the distance that piston 78 can be moved.

It has been found in practice that, if screw 82 is adjusted to prevent any movement of piston 78 or if device 75 is removed and channel 77 is plugged and if high pressure liquid is introduced into port 8 at a rate considerably less than the rate at which liquid can flow from port 8 to port 7 when valve 12 is open, the resistance valve will function in the above described manner but to a lesser degree for the reason that the liquid in chamber 22 and in the channels communicating therewith has sufficient compressibility to permit a relatively low pressure in port 8 to lift valve 12 far enough to permit liquid to flow from port 8 to port 7 in a volume sufficient to prevent any shock due to the sudden rush of pressure.

The main cylinder of a hydraulic speed press should be "decompressed" before it is freely opened to the surge tank as otherwise a violent shock will occur. In order that a resistance valve embodying the present invention may be employed for that and for similar purposes, it has been shown in Fig. 5 provided with a decompression unit 85 which has been indicated as being arranged in pilot head 2 but which may be made separately and bolted to head 2.

As shown, unit 85 includes a valve 86 which is fitted in a bore 87 to control communication between two annular grooves or ports 88 and 89 formed in the wall thereof, a spring 90 which normally holds valve 86 in a position to block communication between ports 88 and 89, and a throttle valve 91 which is fitted in a bore 92 and limits the rate at which liquid can flow from bore 92 into port 89. Bore 92 is connected to pressure chamber 22, as by means of a channel 93 which connects it to channel 77, and port 88 preferably is connected to outlet port 7 as by being connected to channel 54 by a channel 94. Valve 86 is connected to a solenoid 95 which when energized will shift valve 86 to a position in which port 89 communicates with port 88 as shown in Fig. 8.

The arrangement is such that, when valve 86 is in the position shown in Fig. 5, no liquid can escape from pressure chamber 22 through channel 93 but, when valve 86 is shifted to the position shown in Fig. 8, pressure in inlet port 8 can raise valve 12 and cause piston 11 to eject liquid from chamber 22 through channels 68, 77 and 93, bores 92 and 87 and channels 94 and 54 into outlet port 7. Valve 12 thus opens at a rate proportional to the rate at which liquid can escape from chamber 22 as determined by the adjustment of throttle valve 91. Consequently, liquid can escape from port 8 into port 7 at a gradually increasing rate so that no shock or noise will occur due to opening valve 12.

Figure 9:
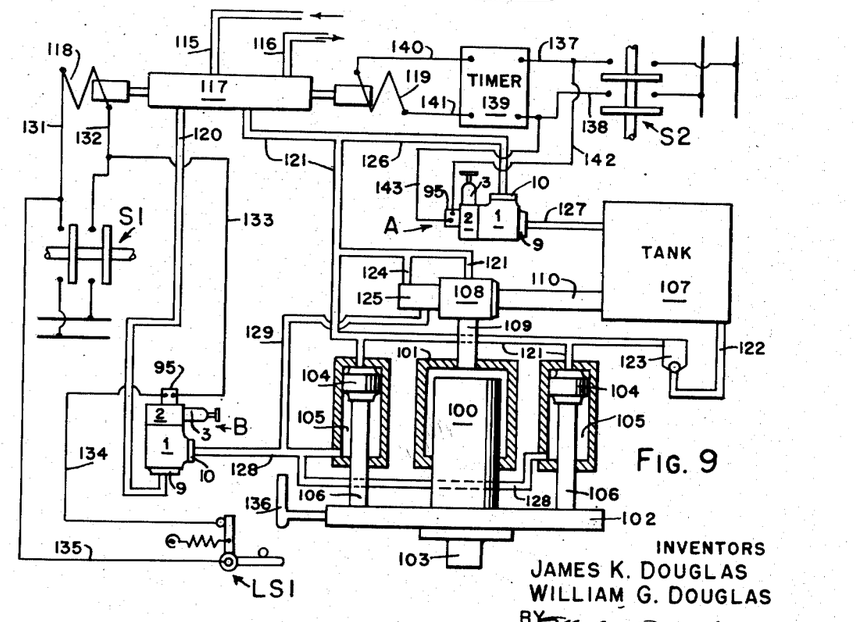
Fig. 9 is a diagram showing valves embodying the invention employed for different purposes in the circuit of a hydraulic press.

*Fig. 9*

One manner in which a resistance valve embodying the present invention may be employed as a decompression valve is illustrated in Fig. 9 which shows a hydraulic speed press having connected into the circuit thereof two resistance valves A and B which are the same as the resistance valve shown in Figs. 1-5, only as much of the press being shown as is necessary to an explanation of the invention. Valve A functions both as a decompression valve and as a relief or safety valve for limiting the pressure that can be created in the press cylinder. Valve B functions as a cushion arrestor for stopping or decelerating the press platen at a predetermined point in its down stroke.

As shown, the press has a vertically movable main ram 100 fitted in a stationary main cylinder 101 and connected to a platen 102 which carries a die 103 for operating upon work not shown, two rapid traverse pistons 104 fitted in stationary cylinders 105 and connected by rods 106 to platen 102, a surge tank 107 to contain a supply of liquid and a surge valve 108 which controls communication between main cylinder 101 and tank 107 and is connected to cylinder 101 by a channel 109 and to tank 107 by a channel 110.

Platen 102 is adapted to descend at high speed under the influence of gravity until die 103 is close to the work and then platen 102 is forced downward at a slower speed by motive liquid supplied to the upper ends of cylinders 101 and 105 from a suitable source such as a pump (not shown) which is supplied with liquid from tank 107 and discharges the liquid into a channel 115. Liquid is returned to the pump or to the tank through a channel 116.

The flow of liquid to and from the press cylinders is controlled by a spring centered control valve 117 which is adapted to be operated by one or the other of two solenoids 118 and 119 and which has channels 115 and 116 connected thereto. Valve 117 is also connected by a channel 120 to the outlet port flange 9 of resistance valve B and by a branched channel 121 to the upper ends of cylinders 104 and to the pressure port of surge valve 108. When neither solenoid is energized, valve 117 connects channel 115 to channel 116 so that the pump is bypassed. When solenoid 118 is energized, valve 117 connects channel 115 to channel 121 and channel 120 to channel 116. When solenoid 119 is energized, valve 117 connects channel 115 to channel 120 and channel 121 to channel 116.

Channel 121 is also connected to tank 107 through a channel 122 and a check valve 123 which permits liquid to flow from tank 107 into cylinders 105 when platen 102 is moving downward under the influence of gravity but which prevents flow from channel 121 into tank 107. Channel 121 is also connected by a channel 124 to the operating cylinder 125 of surge valve 108 and by a channel 126 to inlet port flange 10 of resistance valve A. The outlet port flange 9 of resistance valve A is connected by a channel 127 to tank 107. Resistance valve B has its inlet port flange 10 connected to the lower ends of both cylinders 105 by a channel 128 which is connected intermediate its ends to the operating cylinder 125 of surge valve 108 by a channel 129.

Solenoid 118 is controlled by a switch S1 which has two terminals thereof connected to opposite sides of a power line and the two opposite terminals thereof connected by two wires 131 and 132 to opposite ends of the winding of solenoid 118. Switch S1 is also the primary control for solenoid 95 of resistance valve B which has been shown as having one end of its winding connected by a wire 133 to wire 132 and the other end of its winding connected by a wire 134 to one terminal of a normally closed limit switch LS1 having the other terminal thereof connected by a wire 135 to wire 131. Switch LS1 is adapted to be opened when platen 102 reaches a given point in its down stroke as by means of an actuator 136 carried by platen 102.

Solenoid 95 of resistance valve A and solenoid 119 are controlled by a switch S2 which has two of its terminals connected to opposite sides of a power line and the two opposite terminals thereof connected by two wires 137 and 138 to two terminals of an electric timer 139 the other two terminals of which are connected by two wires 140 and 141 to opposite ends of the winding of solenoid 119. The solenoid 95 of resistance valve A has been shown as having one end of its winding connected to wire 137 by a wire 142 and the other end of its winding connected to wire 138 by a wire 143.

The arrangement is such that, when switches S1 and S2 are open and platen 102 is in its upper position as shown, the pump is bypassed through valve 117 and platen 102 is held up by the liquid in the lower ends of cylinders 105 for the reason that resistance valve B is closed so that no liquid can escape from cylinders 105. The weight of platen 102 and the parts movable therewith create pressure in the lower parts of cylinders 105 and this pressure extends through channel 128, port 8 (Fig. 5) of valve B, channel 62, pilot valve sleeve 29 and channel 67 into pressure chamber 22 and holds valve B closed.

When switch S1 is closed, solenoid 95 of valve B and solenoid 118 will be energized. Solenoid 118 will cause valve 117 to connect channel 115 to channel 121 and channel 120 to channel 116. Solenoid 95 of valve B will shift valve 86 to the position shown in Fig. 8 to thereby cause valve B to open, as previously described, and permit liquid to flow from cylinders 105 through channel 128, valve B, channel 120, valve 117 and channel 116 to the tank or to the intake of the pump as the case may be. Piston 11 (Fig. 5) of valve B will move valve 12 away from its seat 6 until the drop in pressure between inlet port 8 and outlet port 7 is reduced to the very low value, such as 25 p. s. i., necessary to overcome the resistance of spring 21. Consequently, the resistance to the flow of liquid through valve B is negligible.

If channel 116 is connected to the tank, platen 102 will descend substantially freely. If channel 116 is connected to the intake of the pump, platen 102 will descend as fast as the pump can draw liquid from the lower ends of cylinders 105. In either case, platen 102 will descend at high speed. As platen 102 descends, liquid from the pump will flow through channel 115, valve 117 and channel 121 into the upper ends of cylinders 105. If the liquid discharged by the pump is insufficient to keep cylinders 105 filled, pistons 104 will draw liquid into cylinders 105 through channel 121, check valve 123 and channel 122 from tank 107.

Platen 102 will continue to descend at high speed until actuator 136 opens limit switch LS1 which will deenergize solenoid 95 of valve B and thereby permit valve 86 (Fig. 5) to be closed by its spring 90. It has previously been explained that liquid continuously flows from port 8 through channel 62, the opening between recess 71 and port 63 of pilot valve 28, sleeve 29 and channel 67 into pressure chamber 22 and escapes freely therefrom when valve 86 is open so that there is substantially no pressure in chamber 22. Closing valve 86 prevents further escape of liquid which then causes piston 11 to move valve 12 toward its seat at a rate proportional to the rate at which the liquid can flow through the opening between recess 71 and port 63 of pilot valve 28.

When the resistance valve is employed to arrest the downward movement of a press platen, some of the shims 33 are removed from beneath stop block 34 to thereby lower the initial position of pilot valve 28. Lowering pilot valve 28 increases the area of the opening between recess 71 and port 63 to thereby increase the rate at which liquid can enter chamber 22 and, consequently, the rate at which piston 11 can close valve 12 but the rate at which liquid can enter chamber 22 is never greater than the rate at which liquid can escape therefrom when valve 86 is open.

Valve 12 will thus be moved gradually but rapidly toward its seat 6 and throttle the flow of liquid from port 8 to port 7 and thereby cause the downward moving platen to create pressure in port 8 and in the lower ends of cylinders 105. Due to the weight and speed of platen 102 and the parts movable therewith, a very high pressure is required in the lower ends of cylinders 105 to decelerate platen 102 to a low or zero speed within a time short enough to be commercially practical.

If valve 12 continued to move rapidly toward its seat until the downward movement of platen 102 was checked, the pressure would rise so suddenly that a violent shock and a resultant noise would occur. However, when the pressure has risen high enough to overcome the resistance of spring 81 in expansion device 75, the liquid entering chamber 22 will flow therefrom into cylinder 76 and raise piston 78. During the time that liquid is flowing into cylinder 76, valve 12 will remain substantially stationary and permit liquid to flow from port 8 to port 7 at the then prevailing pressure, thereby preventing any shock in the system.

By adjusting nut 80 and screw 82 of expansion device 75, throttle valve 91 and the opening between recess 71 and port 63 in respect to each other and to the weight and speed of the platen of the press to which the resistance valve is connected, the platen may be decelerated from high speed to a low or zero speed without shock almost as quickly as it could be decelerated by using a conventional relief valve which would cause a violent shock.

As platen 102 decelerates, the pressure in the lower ends of cylinders 105 and port 8 will decrease due to the decrease in the speed of platen 102. When platen 102 has been decelerated to a low or zero speed, the pressure in the lower ends of cylinder 105 will have decreased to the low value necessary to support the weight of platen 102 and the parts movable therewith and resistance valve B will adjust itself in the previously described manner to maintain that pressure.

Then the liquid delivered through channel 121 to the upper ends of cylinders 105 will cause pistons 104 to move platen 102 downward until die 103 engages the work which will cause the pressure in channel 121 to rise and extend through channel 124 into operating cylinder 125 and, when it becomes high enough, it will cause surge valve 108 to close communication between ram cylinder 101 and surge tank 107 and to open communication between cylinder 101 and channel 121. Then liquid will flow from channel 121 into cylinder 101 and platen 102 will be moved downward to perform a pressing operation by liquid acting upon ram 101 and upon pistons 104.

If the pressure in channel 121 should rise to a predetermined maximum either before or after the pressing operation is completed, resistance valve A will be opened in the above described manner and permit liquid to escape from channel 121 into tank 107 and, if the pressure should rise to maximum very suddenly no shock will occur for the reason that valve A will open momentarily at a pressure less than the maximum pressure as previously explained.

After the pressing operation is completed, switch S1 is opened to deenergize solenoid 118 and permit valve 117 to cut off further flow of liquid to cylinders 101 and 105 and switch S2 is closed to effect reversal of the press. If surge valve 108 were opened immediately, the large volume of compressed liquid in cylinder 101 would expand instantly and cause a violent shock and a resultant noise. However, closing switch S2 instantly energizes solenoid 95 of valve A and starts timer 139 operating. Solenoid 95 opens valve 86 which causes valve A to open in the previously described manner so that liquid can escape from cylinder 101 through channel 109, surge valve 108, channels 121 and 127, valve A and channel 129 into tank 107, thereby releasing the pressure in cylinder 101 without shock. Immediately after valve A opens, timer 139 energizes solenoid 119 which will operate valve 117 to connect channel 115 to channel 120 and channel 121 to channel 116.

Then liquid will flow from channel 115 through valve 117 and channel 120 to port 7 of resistance valve B. The liquid will first shift valve 45 of valve B to the position shown in Fig. 7 and then it will move valve 12 away from its seat, as previously explained, so that the liquid can then flow substantially freely to the lower ends of cylinders 105 and cause pistons 104 to raise platen 102. As platen 102 moves upward, ram 100 will eject liquid from cylinder 101 through channel 109, surge valve 108 and channel 110 into tank 107 and pistons 104 will eject liquid from cylinders 105 through channel 121 and valve 117 into return channel 116.

Figures 10, 11:
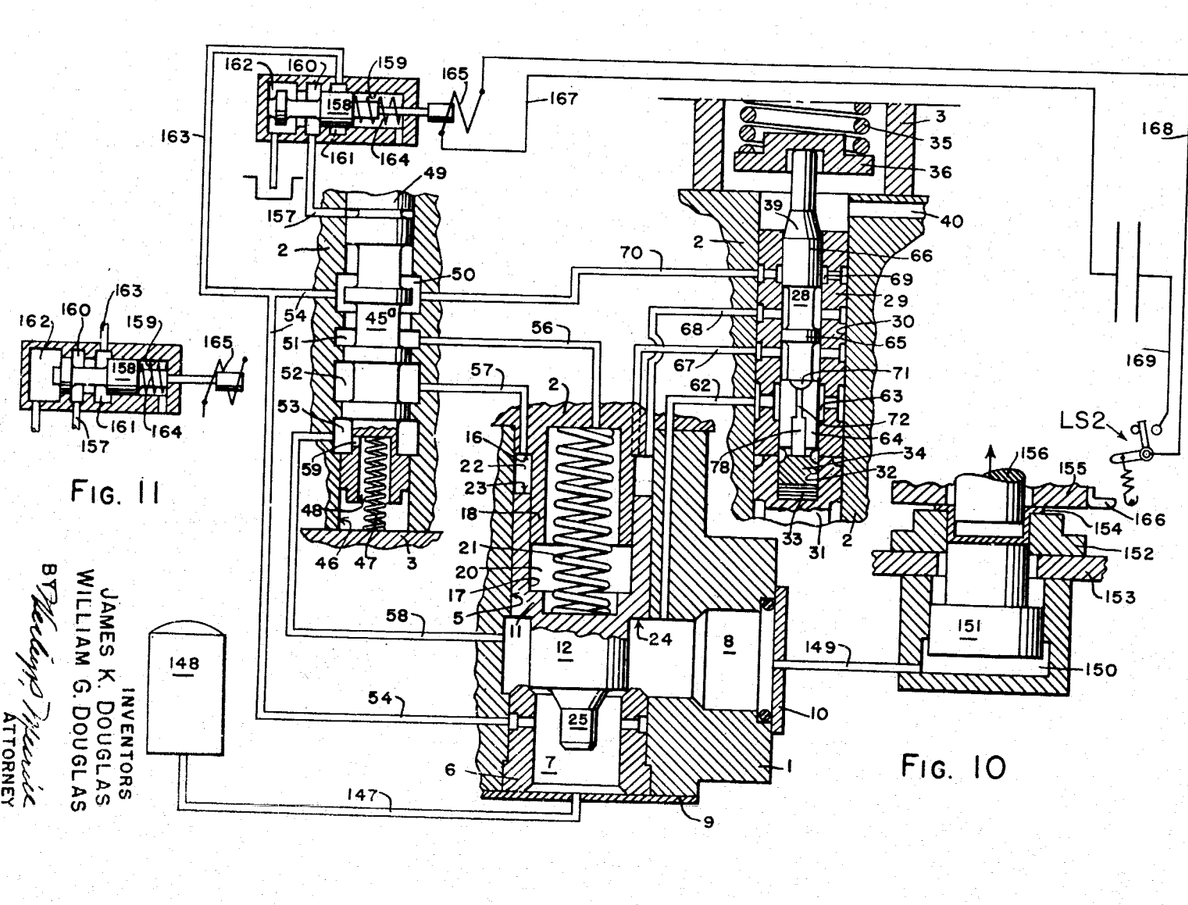
Fig. 10 is a diagram showing an embodiment of the invention employed to control the hydraulic die cushion of a draw press.
Fig. 11 is a view showing a valve in a position different from that shown in Fig. 10.

*Figs. 10 and 11*

It is common practice to maintain desired pressures in the hydraulic die cushion of a draw press by ejecting liquid from the cushion through a resistance valve into an accumulator during the drawing stroke of the press ram and to return liquid from the accumulator to the cushion through a check valve during the return stroke of the press ram in which case the die cushion starts to return to its initial position as soon as the press ram starts to retract. In many instances however, the die cushion should not start to return to its initial position until after the press ram has been retracted a substantial distance in which case it is necessary to provide a separate valve for blocking flow of liquid from the accumulator to the cushion and means for operating the valve.

A resistance valve embodying the present invention may be employed to resist the discharge of liquid from and to control the flow of liquid into the hydraulic cushion of a draw press as by having its port 7 connected by a channel 147 to an accumulator 148 and its port 8 connected by a channel 149 to a die cushion as indicated in Fig. 10.

The die cushion may be of various forms and be employed with various types of presses but for the purpose of illustration it has been schematically shown as including a stationary cylinder 150 and a plunger 151 which is fitted in cylinder 150 and extends upward into a female die 152 arranged upon the stationary bolster 153 of a draw press. The upper end of plunger 151 is adapted to engage a work piece 154 which initially is a flat blank and is clamped against the upper face of die 152 by a draw ring 155 and which is formed into a desired shape by being forced into die 152 by a male die 156 carried by the platen of the press (not shown).

When a resistance valve embodying the invention is employed for this purpose, it is provided with a reverse flow valve 45ᵃ which is the same as reverse flow valve 45 of Fig. 3 except that passage 55 is omitted or plugged so that liquid cannot flow from port 50 into the end of bore 46 and shift the valve into the position shown in Fig. 7 in response to the pressure in port 7 exceeding the pressure in port 8 by a small amount as is the case with valve 45. Instead, valve 45ᵃ is adapted to be shifted to the position shown in Fig. 7 in response to an electric signal.

As shown, valve 45ᵃ is adapted to be shifted to the position shown in Fig. 7 by liquid supplied through a channel 157 to the end of bore 46 under the control of a valve 158 which is fitted in a bore 159 to control communication between three annular grooves or ports 160, 161 and 162 formed in the wall thereof. Port 160 has channel 157 connected thereto, port 161 is connected by a channel 163 to channel 54 and port 162 is connected to exhaust.

The resistance valve is otherwise the same as the valve shown in Figs. 1-5. Consequently, like parts have been indicated by like reference numerals so that further description thereof is unnecessary.

Valve 158 is urged to the position shown in Fig. 10 by a spring 164 and it is adapted to be shifted to the position shown in Fig. 11 by a solenoid 165 which is connected to the stem of valve 158. In the present instance, solenoid 165 has been shown as being under the control of a normally open limit switch LS2 which is adapted to be closed during the up-stroke of the press platen as by means of an actuator 166 carried by draw ring 155. Solenoid 165 has been shown as having one end of its winding connected by a wire 167 to one side of a power line and the other end of its winding connected by a wire 168 to one terminal of switch LS2 the other terminal of which is connected by a wire 169 to the other side of the power line.

When the press platen is in its upper position and work piece 154 is a flat blank resting upon die 152, plunger 151 will be in its upper position and have its upper end in contact with the blank.

Then downward movement of the press platen will first cause draw ring 155 to clamp the margin of the blank against die 152 and then will cause die 156 to force the blank into die 152 to form it into the desired shape.

Plunger 151 will move downward with die 156 but in order to do so it must eject liquid from cylinder 150 which will cause it to almost instantly create in cylinder 150 and in port 8 a pressure high enough to open the resistance valve. The pressure will first extend from port 8 through channel 62, pilot valve bushing 29 and channel 67 into chamber 22 and act upon hold-on area 23 until it becomes high enough to move pilot valve 28 to the position shown in Fig. 6 which will connect port 7 to chamber 22, as previously explained, and thereby cause hold-on area 23 to be subjected to the pressure in accumulator 48 instead of to the pressure in port 8.

Plunger 151 will continue to increase the pressure in port 8 until the force exerted by the liquid upon lifting area 24 is great enough to open valve 12 against the resistance of spring 21 and the accumulator pressure acting upon hold-on area 23. Plunger 151 will then eject liquid from cylinder 150 through channel 149, ports 8 and 7 and channel 147 into accumulator 148. The upper end of plunger 151 is thus urged against the central portion of work piece 154 by a force proportional to the pressure required to open the resistance valve.

When the draw is completed, the downward movement of die 156 is stopped which will cause the pressure in cylinder 150 and in port 8 to drop to the pressure prevailing in accumulator 148 and thereby permit spring 21 and the pressure acting upon hold-on area 23 to close valve 12. The press platen then moves upward and first retracts die 156 (as indicated by the arrow thereon) to strip work piece 154 therefrom and then it retracts draw ring 155 but plunger 151 will not move upward because valve 12 is closed.

Plunger 151 will remain stationary until actuator 166 closes limit switch LS2 and thereby causes solenoid 165 to be energized and to shift valve 158 to the position shown in Fig. 11 which will permit liquid to flow from accumulator 148 through channel 147, port 7, channels 54 and 163, valve bore 159 and channel 157 into the upper end of bore 46 and move valve 45ª downward into a position corresponding to the position of valve 45 in Fig. 7. Then liquid will flow from accumulator 148 through channel 147 into port 7 and cause valve 12 to move away from seat 6 and piston 11 to eject liquid from chambers 20 and 22 through channels 56 and 57, valve bore 46 and channel 58 into port 8 the pressure in which is very low at this time due to draw ring 155 having released work piece 154. As valve 12 moves away from seat 6, the liquid entering port 7 will flow through port 8 and channel 149 to cylinder 150 and raise plunger 151. When plunger 151 stalls at the end of its up stroke, the pressure in cylinder 150 and in accumulator 148 will equalize.

The invention herein set forth is susceptible of various modifications and adaptations without departing from the scope of the invention which is hereby claimed as follows:

1. A resistance valve comprising a casing having a bore and an inlet communicating with said bore, an annular valve seat arranged in said bore at one side of said inlet and constituting an outlet, a hollow stationary piston smaller than said bore extending into said bore from the end thereof opposite said outlet, means for supporting said stationary piston and for closing the adjacent end of said bore, a main valve for engaging said seat to block communication between said inlet and said outlet, a hollow movable piston fixed to said valve and fitted in said bore and upon said stationary piston with its annular end spaced from said supporting means and forming therewith and with said stationary piston and the wall of said bore a substantially fluid tight pressure chamber, the interiors of said hollow pistons constituting a spring chamber, a spring arranged within said spring chamber and engaging the end walls thereof to normally hold said main valve against said valve seat, an annular lifting area arranged upon said movable piston around said main valve and exposed to any pressure in said inlet, said annular end of said movable piston constituting a hold-on area which is slightly larger than said lifting area and upon which pressure in said pressure chamber may act and urge said valve against said seat, and means for providing for flow of liquid from said inlet into said pressure chamber and from that chamber to exhaust including a pressure responsive pilot valve connected to said inlet and to said chamber and to exhaust and providing a restriction for limiting the rate of flow from said inlet into said pressure chamber, said pilot valve being normally closed to prevent escape of liquid from said chamber to exhaust and being adapted in response to the pressure in said inlet reaching a predetermined maximum to open and permit liquid to flow from said chamber to exhaust faster than liquid can flow through said restriction.

2. A resistance valve comprising a casing having a bore and an inlet communicating with said bore, an annular valve seat arranged in said bore at one side of said inlet and constituting an outlet, a hollow stationary piston smaller than said bore extending into said bore from the end thereof opposite said outlet, means for supporting said stationary piston and for closing the adjacent end of said bore, a main valve for engaging said seat to block communication between said inlet and said outlet, a hollow movable piston fixed to said valve and fitted in said bore and upon said stationary piston with its annular end spaced from said supporting means and forming therewith and with said stationary piston and the wall of said bore a substantially fluid tight pressure chamber, the interiors of said hollow pistons constituting a spring chamber, a spring arranged within said spring chamber and engaging the end walls thereof to normally hold said main valve against said valve seat, an annular lifting area arranged upon said movable piston around said main valve and exposed to any pressure in said inlet, said annular end of said movable piston constituting a hold-on area which is slightly larger than said lifting area and upon which pressure in said pressure chamber may act and urge said valve against said seat, means providing communication between said inlet and said pressure chamber including a restriction to limit the rate at which liquid can flow from said inlet into said pressure chamber, channel means through which liquid can escape from said pressure chamber faster than it can enter said chamber through said restriction, a normally closed pilot valve operable independently of the pressure in said pressure chamber for blocking said channel means to prevent escape of liquid therethrough and adapted to open and permit liquid to escape from said pressure chamber in response to the pressure in said inlet reaching a predetermined maximum, other channel means through which liquid can escape from said pressure chamber faster than it can enter said chamber through said restriction, a normally closed decompression valve for blocking said other channel means to prevent escape of liquid therethrough, a choke connected in series with said decompression valve for limiting the rate at which liquid can flow therethrough, and means for opening said decompression valve to permit liquid to escape from said pressure chamber and thereby cause the inlet pressure acting upon said lifting area to open said main valve at a rate determined by the rate at which liquid can flow through said choke.

3. A resistance valve comprising a casing having a bore and an inlet communicating with said bore, an annular valve seat arranged in said bore at one side of said inlet and constituting an outlet, a hollow stationary piston smaller than said bore extending into said bore from the end thereof opposite said outlet, means for supporting said stationary piston and for closing the adjacent end of said bore, a main valve for engaging said seat to block communication between said inlet and said outlet, a hollow movable piston fixed to said valve and fitted in said bore and upon said stationary piston with its annular end spaced from said supporting means and forming therewith and with said stationary piston and the wall of said bore a substantially fluid tight pressure chamber, the interiors of said hollow pistons constituting a spring chamber, a spring arranged within said spring chamber and engaging the end walls thereof to normally hold said main valve against said valve seat, an annular lifting area arranged upon said movable piston around said main valve and exposed to any pressure in said inlet, said annular end of said movable piston constituting a hold-on area which is slightly larger than said lifting area and upon which pressure in said pressure chamber may act and urge said valve against said seat, means providing communication between said inlet and said pressure chamber including a restriction to limit the rate at which liquid can flow from said inlet into said pressure chamber, channel means through which liquid can escape from said pressure chamber faster than it can enter said chamber through said restriction, a normally closed pilot valve for blocking said channel means to prevent escape of liquid therethrough and adapted to open and permit liquid to escape from said pressure chamber in response to the pressure in said inlet reaching a predetermined maximum, a cylinder communicating at one end thereof with said pressure chamber, a third piston fitted in said cylinder, and a spring urging said third piston against said one end of said cylinder and adapted to yield in response to said piston being subjected to a predetermined pressure to thereby cause said main valve to open and said movable piston to eject liquid from said pressure chamber into said cylinder in response to the pressure in said inlet being suddenly increased to a value which is less than said maximum pressure and which exceeds the pressure in said pressure chamber by a predetermined amount.

4. A resistance valve according to claim 3 including means for limiting the distance said third piston can move to thereby limit the distance said main valve can be moved away from its seat by said sudden increase in pressure.

5. A resistance valve comprising a casing having a bore and an inlet communicating with said bore, an annular valve seat arranged in said bore at one side of said inlet and constituting an outlet, a hollow stationary piston smaller than said bore extending into said bore from the end thereof opposite said outlet, means for supporting said stationary piston and for closing the adjacent end of said bore, a main valve for engaging said seat to block communication between said inlet and said outlet, a hollow movable piston fixed to said valve and fitted in said bore and upon said stationary piston with its annular end spaced from said supporting means and forming therewith and with said stationary piston and the wall of said bore a substantially fluid tight pressure chamber, the interiors of said hollow pistons constituting a spring chamber, a spring arranged within said spring chamber and engaging the end walls thereof to normally hold said main valve against said valve seat, an annular lifting area arranged upon said movable piston around said main valve and exposed to any pressure in said inlet, said annular end of said movable piston constituting a hold-on area which is slightly larger than said lifting area and upon which pressure in said pressure chamber may act and urge said valve against said seat, means providing communication between said inlet and said pressure chamber including a restriction to limit the rate at which liquid can flow from said inlet into said pressure chamber, channel means through which liquid can escape from said pressure chamber faster than it can enter said chamber through said restriction, a normally closed pilot valve for blocking said channel means to prevent escape of liquid therethrough and adapted to open and permit liquid to escape from said pressure chamber in response to the pressure in said inlet reaching a predetermined maximum, a reverse flow valve having a bore and a valve plunger in said bore, a first channel for connecting said pressure chamber to said valve bore, a second channel for connecting said spring chamber to said valve bore, a third channel for connecting said valve bore to said inlet, a fourth channel for connecting said bore to said outlet, a spring for urging said plunger to a position in which it blocks said first channel and connects said second channel to said fourth channel, and means for causing said plunger to shift to a position in which it connects said first and second channels to said third channel in response to the pressure in said outlet exceeding the pressure in said inlet by a predetermined amount to thereby enable the pressure in said outlet to open said main valve.

6. A resistance valve comprising a casing having a bore and an inlet communicating with said bore, an annular valve seat arranged in said bore at one side of said inlet and constituting an outlet, a hollow stationary piston smaller than said bore extending into said bore from the end thereof opposite said outlet, means for supporting said stationary piston and for closing the adjacent end of said bore, a main valve for engaging said seat to block communication between said inlet and said outlet, a hollow movable piston fixed to said valve and fitted in said bore and upon said stationary piston with its annular end spaced from said supporting means and forming therewith and with said stationary piston and the wall of said bore a substantially fluid tight pressure chamber, the interiors of said hollow pistons constituting a spring chamber, a spring arranged within said spring chamber and engaging the end walls thereof to normally hold said main valve against said valve seat, an annular lifting area arranged upon said movable piston around said main valve and exposed to any pressure in said inlet, said annular end of said movable piston constituting a hold-on area which is slightly larger than said lifting area and upon which pressure in said pressure chamber may act and urge said valve against said seat, means providing communication between said inlet and said pressure chamber including a restriction to limit the rate at which liquid can flow from said inlet into said pressure chamber, channel means through which liquid can escape from said pressure chamber faster than it can enter said chamber through said restriction, a normally closed pilot valve for blocking said channel means to prevent escape of liquid therethrough and adapted to open and permit liquid to escape from said pressure chamber in response to the pressure in said inlet reaching a predetermined maximum, a reverse flow valve having a bore and a valve plunger in said bore, a first channel for connecting said pressure chamber to said valve bore, a second channel for connecting said spring chamber to said valve bore, a third channel for connecting said valve bore to said inlet, a fourth channel for connecting said valve bore to said outlet, a spring for urging said plunger to a position in which it blocks said first channel and connects said second channel to said fourth channel, means adapted when effective to cause said plunger to shift to a position in which it connects said first and second channels to said third channel to thereby enable the pressure in said outlet to open said main valve, and electrical means for rendering said last named means effective or ineffective.

7. A resistance valve according to claim 1 in which the inner diameter of said hollow movable piston is nearly the same as the diameter of said main valve and which includes means for connecting said spring chamber either to said outlet, so that any force exerted upon said main valve due to pressure in said outlet is opposed by a nearly equal force, or to said inlet so that said main valve will be opened in response to the pressure in said outlet exceeding the pressure in said inlet by a small amount.

8. The combination with an electric switch, an actuator for said switch and a push rod having one end thereof in engagement with said actuator of a resistance valve according to claim 1 and including a tapered surface arranged upon said pilot valve and adapted to engage the other end of said rod and to move said rod outward to operate said actuator in response to said pilot valve being moved to a position to permit liquid to escape from said pressure chamber.

9. A resistance valve comprising a casing having an inlet and an outlet, an annular valve seat arranged around said outlet, a main valve for engaging said seat to block communication between said inlet and said outlet, means for initially moving said main valve into engagement with said seat, a hydraulic servo-motor including a stationary cylinder and a piston fitted in said cylinder and fixed to said main valve, said piston having a lifting area exposed to any pressure in said inlet and a slightly larger hold-on area exposed to any pressure in said cylinder, a valve cylinder arranged in said casing and having an inlet port and an exhaust port formed in the wall thereof, a first channel connecting said inlet port to said inlet, a second channel connecting said valve cylinder at a point near said exhaust port to said servo-motor substantially at the highest point thereof, a third channel connecting said valve cylinder at a point near said inlet port to said servo-motor at a point spaced from said second channel, a fourth channel connected to said exhaust port to conduct liquid therefrom, a pilot valve fitted in said valve cylinder and having a first piston which at all times blocks communication between said second and said third channels and a second piston and a third piston spaced from opposite sides of said first piston, means for supporting said pilot valve in a position in which said second piston blocks communication between said second channel and said outlet port and said third piston provides between the edge of said inlet port and the interior of said valve cylinder a restricted opening through which liquid may flow at a limited rate from said inlet to said servo-motor, a spring normally holding said pilot valve against said supporting means, and means for subjecting the other end of said pilot valve to the pressure in said inlet to thereby cause said pilot valve to be shifted to a position in which it opens communication between said second channel and said outlet port to permit liquid to escape from said servo-motor in response to the pressure in said inlet rising to a predetermined maximum as determined by the resistance of said spring.

10. A resistance valve according to claim 9 in which said pilot valve supporting means includes a plurality of shims which may be varied in number to thereby vary the area of the opening between the edge of said inlet port and the interior of said valve cylinder to thereby vary the rate at which liquid can flow from said inlet to said servo-motor.

11. A resistance valve according to claim 9 in which said third piston of said pilot valve has formed therein a recess to provide an opening of limited area between said inlet port and the interior of said valve cylinder and a groove extending from said recess to the end of said piston to subject the end of said pilot valve to the pressure in said inlet.

12. A resistance valve according to claim 11 in which said recess and said groove are so shaped that the effective area of said opening is reduced in response to said pilot valve moving away from said supporting means.

13. A resistance valve according to claim 9 in which said third piston of said pilot valve has formed therein a recess to provide an opening of limited area between said inlet port and the interior of said valve cylinder and a groove extending from said recess to the end of said piston to subject the end of said pilot valve to the pressure in said inlet, and in which said pilot valve supporting means includes a plurality of shims which may be varied in number to thereby vary the area of said opening.

14. A resistance valve comprising a casing having an inlet and an outlet, an annular valve seat arranged around said outlet, a main valve for engaging said seat to block communication between said inlet and said outlet, means for initially moving said main valve into engagement with said seat, a hydraulic servo-motor including a stationary cylinder and a piston fitted in said cylinder and fixed to said main valve, said piston having a lifting area exposed to any pressure in said inlet and a slightly larger hold-on area exposed to any pressure in said cylinder, means providing communication between said inlet and said servo-motor including a restriction to limit the rate at which liquid can flow from said inlet into said servo-motor, channel means through which liquid can escape from said pressure chamber faster than it can enter said chamber through said restriction, a normally closed pilot valve operable independently of the pressure in said pressure chamber for blocking said channel means to prevent escape of liquid therethrough and adapted to open and permit liquid to escape from said pressure chamber in response to the pressure in said inlet reaching a predetermined maximum, other channel means through which liquid can escape from said pressure chamber faster than it can enter said chamber through said restriction, a normally closed decompression valve for blocking said other channel means to prevent escape of liquid therethrough, a choke connected in series with said decompression valve for limiting the rate at which liquid can flow therethrough and means for opening said decompression valve to permit liquid to escape from said pressure chamber and thereby cause the inlet pressure acting upon said lifting area to open said main valve at a rate determined by the rate at which liquid can flow through said choke.

15. A resistance valve comprising a casing having an inlet and an outlet, an annular valve seat arranged around said outlet, a main valve for engaging said seat to block communication between said inlet and said outlet, means for initially moving said main valve into engagement with said seat, a hydraulic servo-motor including a stationary cylinder and a piston fitted in said cylinder and fixed to said main valve, said piston having a lifting area exposed to any pressure in said inlet and a slightly larger hold-on area exposed to any pressure in said cylinder, means providing communication between said inlet and said servo-motor including a restriction to limit the rate at which liquid can flow from said inlet into said servo-motor, channel means through which liquid can escape from said pressure chamber faster than it can enter said chamber through said restriction, a normally closed pilot valve for blocking said channel means to prevent escape of liquid therethrough and adapted to open and permit liquid to escape from said pressure chamber in response to the pressure in said inlet reaching a predetermined maximum, a cylinder communicating at one end thereof with said servo-motor, a piston fitted in said cylinder, and a spring urging said piston against said one end of said cylinder and adapted to yield in response to said piston being subjected to a predetermined pressure to thereby cause said main valve to open and said movable piston to eject liquid from said servo-motor into said cylinder in response to the pressure in said inlet being suddenly increased to a value which is less than said maximum pressure and which exceeds the pressure in said servo-motor by a predetermined amount.

16. A resistance valve comprising a casing having an inlet and an outlet, an annular valve seat arranged around said outlet, a main valve for engaging said seat to block communication between said inlet and said outlet, means for initially moving said main valve into engagement with said seat, a hydraulic servo-motor including a stationary cylinder and a piston fitted in said cylinder and fixed to said main valve, said piston having a lifting area exposed to any pressure in said inlet and a slightly larger hold-on area exposed to any pressure in said cylinder, means providing communication between said inlet and said servo-motor including a restriction to limit the rate at which liquid can flow from said inlet into said servo-motor, channel means through which liquid can escape from said pressure chamber faster than it can enter said chamber through said restriction, a normally closed pilot valve for blocking said channel means to prevent escape of liquid therethrough and adapted to open and permit liquid to escape from said pressure chamber in response to the pressure in said inlet reaching a predetermined maximum, a cylinder communicating at one end thereof with said servo-motor, a piston fitted in said cylinder, a spring urging said piston against said one end of said cylinder and adapted to yield in response to said piston being subjected to a predetermined pressure to thereby cause said main valve to open and said movable piston to eject liquid from said servo-motor into said cylinder in response to the pressure in said inlet being suddenly increased to a value which is less than said maximum pressure and which exceeds the pressure in said servo-motor by a predetermined amount, other channel means through which liquid can escape from said pressure chamber faster than it can enter said chamber through said restriction, a normally closed decompression valve for blocking said other channel means to prevent escape of liquid therethrough, and means for opening said decompression valve to permit liquid to escape from said pressure chamber and thereby cause the inlet pressure acting upon said lifting area to open said main valve.

17. A resistance valve comprising a casing having an inlet and an outlet, an annular valve seat arranged around said outlet, a main valve for engaging said seat to block communication between said inlet and said outlet, means for initially moving said main valve into engagement with said seat, a hydraulic servo-motor including a stationary cylinder and a piston fitted in said cylinder and fixed to said main valve, said piston having a lift-area exposed to any pressure in said inlet and a slightly larger hold-on area exposed to any pressure in said cylinder, means providing communication between said inlet and said servo-motor including a restriction to limit the rate at which liquid can flow from said inlet into said servo-motor, channel means through which liquid can escape from said pressure chamber faster than it can enter said chamber through said restriction, a normally closed pilot valve for blocking said channel means to prevent escape of liquid therethrough and adapted to open and permit liquid to escape from said pressure chamber in response to the pressure in said inlet reaching a predetermined maximum, a reverse flow valve having a bore and a valve plunger in said bore, a first channel for connecting said servo-motor to said bore, a second channel for connecting said bore to said inlet, a third channel for connecting said bore to said outlet, a spring for urging said plunger to a position in which it blocks said first channel, and means for causing said plunger to shift to a position in which it connects said first channel to said second channel in response to the pressure in said outlet exceeding the pressure in said inlet by a predetermined amount to thereby enable the pressure in said outlet to open said main valve.

18. A resistance valve comprising a casing having an inlet and an outlet and a bore in axial alinement with said outlet, an annular valve seat arranged around said outlet, a main valve for engaging said seat to block communication between said inlet and said outlet, means for urging said valve into engagement with said seat, a piston fitted in said bore and fixed to said valve, said piston having a lifting area exposed to any pressure in said inlet and a hold-on area exposed to any pressure in said bore, a pilot valve cylinder having an inlet port connected to said inlet and an exhaust port for discharge of liquid from said bore, channel means connecting said bore to said cylinder between said ports, a pilot valve fitted in said cylinder and having a first piston for controlling communication between said channel means and said exhaust port and a second piston associated with said inlet port and provided with a restricted passage through which pressure can extend and liquid can flow at a limited rate from said inlet into said bore, a spring for urging said plunger to a closed position in which said first piston blocks communication between said channel means and said exhaust port, and means responsive to the pressure in said inlet reaching a predetermined maximum for causing said pilot valve to move against the resistance of said spring to an open position in which said first piston opens communication between said channel means and said exhaust port to permit liquid to flow from said bore to exhaust faster than liquid can enter said bore through said restricted passage to thereby enable the inlet pressure acting upon said lifting area to open said main valve.

19. A resistance valve according to claim 18 in which said restricted passage is so shaped that its effective cross-sectional area is reduced in response to said pilot valve moving toward its open position.

20. A resistance valve according to claim 1 in which said means for supporting said stationary piston and for closing the end of said bore is a pilot head having said pilot valve arranged therein and which includes inlet and outlet channels arranged in said head for connecting said pilot valve to said bore at spaced apart points, and a plurality of bolts for fastening said head to said casing, said bolts being equally spaced around a circle concentric with said bore so that said head may be connected to said casing in any one of a plurality of different positions to thereby connect said outlet channel to approximately the highest part of said bore when said casing is mounted in any one of a plurality of different positions.

JAMES K. DOUGLAS.
WILLIAM G. DOUGLAS.

References Cited in the file of this patent

UNITED STATES PATENTS

| Number | Name | Date |
|---|---|---|
| 934,083 | Mills | Sept. 14, 1909 |
| 1,807,191 | Boyle | May 26, 1931 |
| 1,965,307 | Darling | July 3, 1934 |
| 2,002,451 | Gray | May 21, 1935 |
| 2,251,441 | Dillman | Aug. 5, 1941 |
| 2,388,820 | Bonnell | Nov. 13, 1945 |